United States Patent
Horn (10) Patent No.: US 10,137,983 B2
(45) Date of Patent: Nov. 27, 2018

(54) UNMANNED AERIAL VEHICLE (UAV) HAVING VERTICAL TAKEOFF AND LANDING (VTOL) CAPABILITY

(71) Applicant: David Horn, Markham (CA)

(72) Inventor: David Horn, Markham (CA)

(73) Assignee: SkyX Limited, Markham, Ontario (CA)

( * ) Notice: Subject to any disclaimer, the term of this patent is extended or adjusted under 35 U.S.C. 154(b) by 72 days.

(21) Appl. No.: 15/168,842

(22) Filed: May 31, 2016

(65) Prior Publication Data

US 2017/0320570 A1    Nov. 9, 2017

(51) Int. Cl.
| | | |
|---|---|---|
| B64C 39/02 | (2006.01) | |
| B64C 29/02 | (2006.01) | |
| B64D 47/08 | (2006.01) | |
| G08G 5/00 | (2006.01) | |

(52) U.S. Cl.
CPC ............ B64C 39/024 (2013.01); B64C 29/02 (2013.01); B64D 47/08 (2013.01); G08G 5/0026 (2013.01); *B64C 2201/021* (2013.01); *B64C 2201/042* (2013.01); *B64C 2201/066* (2013.01); *B64C 2201/104* (2013.01); *B64C 2201/108* (2013.01); *B64C 2201/165* (2013.01); *B64D 2211/00* (2013.01)

(58) Field of Classification Search
None
See application file for complete search history.

(56) References Cited

U.S. PATENT DOCUMENTS

| | | |
|---|---|---|
| 8,511,606 B1 | 8/2013 | Lutke et al. |
| 8,950,698 B1 * | 2/2015 | Rossi ............... B64C 37/02 244/2 |
| 9,051,043 B1 | 6/2015 | Peeters et al. |
| 2014/0022051 A1 * | 1/2014 | Levien ............ G05D 1/0011 340/5.2 |
| 2014/0032034 A1 | 1/2014 | Raptopoulos et al. |
| 2016/0039542 A1 * | 2/2016 | Wang ............... B60L 11/1809 701/2 |

(Continued)

FOREIGN PATENT DOCUMENTS

| | | |
|---|---|---|
| DE | 10 2015 206844 | 11/2015 |
| WO | WO 2013/048339 | 4/2013 |
| WO | WO 2016013933 A1 | 1/2016 |

*Primary Examiner* — Tamara L Weber
(74) *Attorney, Agent, or Firm* — Fay Sharpe LLP (57) ABSTRACT

An unmanned aerial vehicle (UAV), or drone, includes a fuselage, left and right airfoil-shaped wings connected to the fuselage to generate lift in forward flight, a left thrust-generating device supported by the left wing, and a right thrust-generating device supported by the right wing. The UAV further includes a vertical stabilizer, a top thrust-generating device mounted to a top portion of the vertical stabilizer, and a bottom thrust-generating device mounted to a bottom portion of the vertical stabilizer. An onboard power source is provided for powering the thrust-generating devices. The left, right, top and bottom thrust-generating devices provide forward thrust during forward flight and also provide vertical thrust to enable the unmanned aerial vehicle to take-off and land vertically when the fuselage is substantially vertical and further enabling the unmanned aerial vehicle to transition between forward flight and vertical take-off and landing.

25 Claims, 6 Drawing Sheets

(56) References Cited

U.S. PATENT DOCUMENTS

| | | | |
|---|---|---|---|
| 2016/0144957 A1* | 5/2016 | Claridge | B64C 29/02 244/6 |
| 2016/0144982 A1 | 5/2016 | Sugumaran | |
| 2016/0156406 A1* | 6/2016 | Frolov | H04W 16/28 455/431 |
| 2016/0314545 A1* | 10/2016 | Jessen | G06Q 30/0278 |
| 2016/0355097 A1* | 12/2016 | Konet | B60L 11/1831 |
| 2017/0075360 A1* | 3/2017 | Von Novak | G05D 1/042 |

\* cited by examiner

UNMANNED AERIAL VEHICLE (UAV) HAVING VERTICAL TAKEOFF AND LANDING (VTOL) CAPABILITY

TECHNICAL FIELD

The present disclosure relates generally to aircraft and, more particularly, to unmanned aerial vehicles (UAVs) or drones.

BACKGROUND

A variety of unmanned aerial vehicles, colloquially known as drones, have been developed for military, reconnaissance and recreational uses such as aerial photography. UAVs can be gas-powered or electrically powered and can be fixed-wing or rotary-wing.

Reconnaissance UAVs are well suited to monitor or surveil remotely sites, remotely situated infrastructure or other features on the ground which cannot be easily accessed by land such as, for example, oil or water pipelines, electric power lines, coastlines, farmland, borders, forest fires, natural disasters, etc.

There is accordingly a need in the industry for improved unmanned aerial vehicles capable of performing extended, long-distance aerial surveillance.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In general and by way of overview, what is disclosed herein is an unmanned aerial vehicle (or drone) that is capable of both forward flight and vertical flight, as well as vertical take-off and landing (VTOL). The VTOL capability enables the UAV to land in a tail-sitting position (i.e., with the nose of the UAV pointing skyward) on an inductive recharging pad of a battery-recharging station. These battery-recharging stations are distributed at predetermined remote sites to permit the UAV to recharge its battery or batteries, thereby prolonging its mission duration. The UAV can thus operate indefinitely, landing periodically to recharge, without having to return to base, except as required for servicing, maintenance and overhaul.

An inventive aspect of the disclosure is an unmanned aerial vehicle (UAV), or drone, that includes a fuselage, left and right airfoil-shaped wings connected to the fuselage to generate lift in forward flight, a left thrust-generating device supported by the left wing, and a right thrust-generating device supported by the right wing. The UAV further includes a vertical stabilizer having a top portion, a top thrust-generating device mounted to the top portion of the vertical stabilizer, a bottom portion of the vertical stabilizer and a bottom thrust-generating device mounted to the bottom portion of the stabilizer. An onboard power source is provided for powering the thrust-generating devices. The left, right, top and bottom thrust-generating devices can provide forward thrust during forward flight and also provide vertical thrust to enable the unmanned aerial vehicle to take-off and land vertically when the fuselage is substantially vertical and further enabling the unmanned aerial vehicle to transition between forward flight and vertical take-off and landing. In some embodiments, the top and bottom thrust-generating devices are disabled during forward flight such that only the left and right thrust-generating devices provide thrust.

BRIEF DESCRIPTION OF THE DRAWINGS

These and other features of the disclosure will become more apparent from the description in which reference is made to the following appended drawings.

DETAILED DESCRIPTION OF EMBODIMENTS

Various embodiments of the invention will now be described in detail with occasional reference to the drawings. These embodiments are meant to exemplify and illustrate inventive aspects and are not meant to be used to restrict the scope of the invention to the exact embodiments described and illustrated. Persons of ordinary skill in the art will readily recognize, having read this disclosure, that various combinations, refinements and modifications may be made to the embodiments described and illustrated herein.

Figure 1:
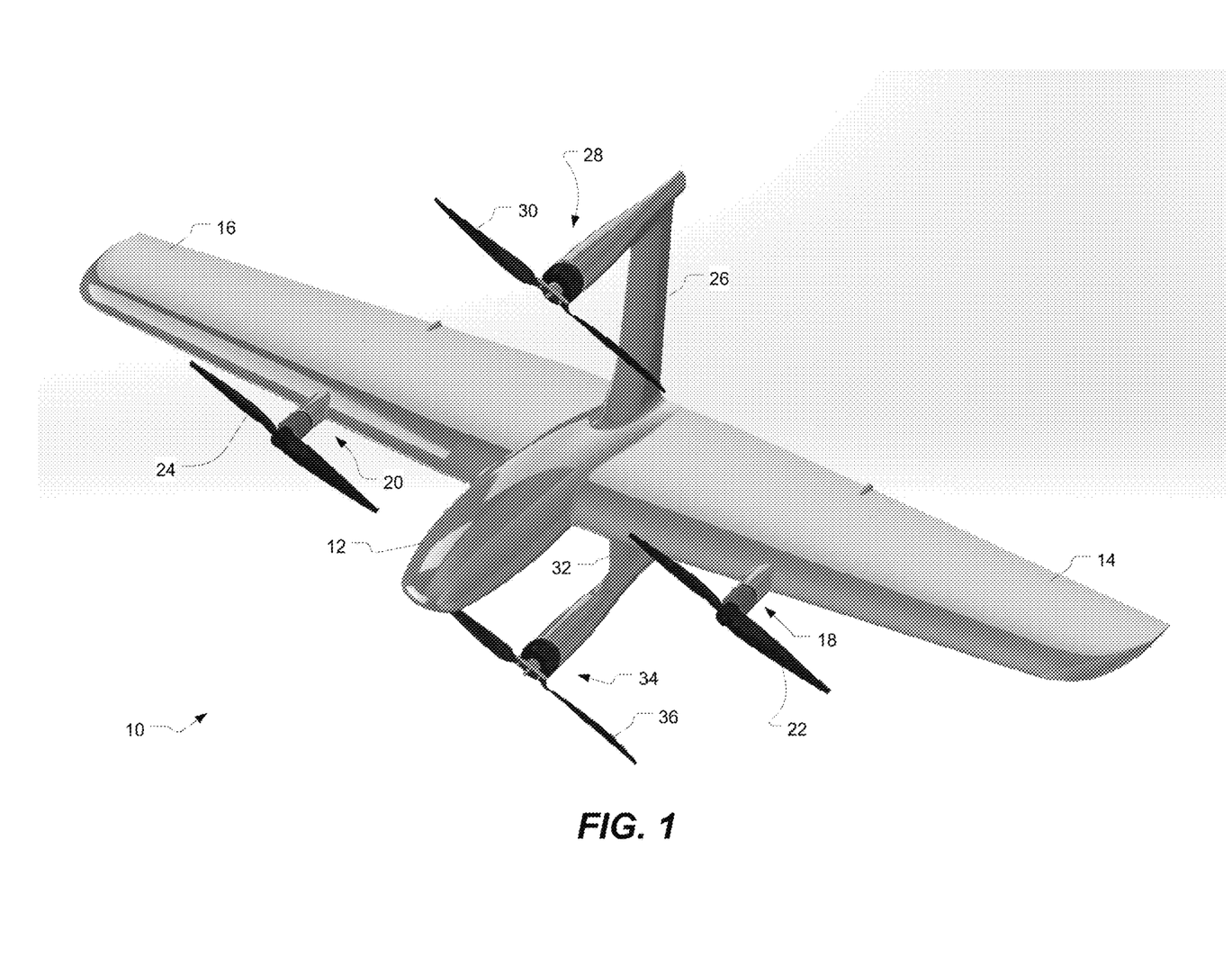
FIG. 1 is a perspective view of an UAV in accordance with an embodiment of the present invention.

In the embodiment illustrated by way of example in FIG. 1, an unmanned aerial vehicle (UAV), or drone, is generally designated by reference numeral 10. The UAV includes a fuselage 12 which may be made of one or more composite materials, e.g. carbon fiber, fiberglass, or a suitable metal such as aluminum, or a suitable plastic or polymer, or any other suitable material or combination of materials. The fuselage may be a truss structure or monocoque or semi-monocoque structure. The fuselage forms the main body of the airframe. The airframe also includes left and right airfoil-shaped wings 14, 16 connected to the fuselage. The left and right wings may be two separate wings or a single integrally formed wing. In other embodiments, there may be more than two wings. The airfoil-shaped wings generate lift in forward flight. The fuselage and/or wings of the airframe may optionally be covered with photovoltaic cells to convert solar radiation into electric power to power one or more onboard electrical systems. The fuselage and/or wings may optionally contain a buoyant gas, e.g. helium or hydrogen, to generate additional lift. The wings may have ailerons and flaps as control surfaces.

As shown by way of example in the embodiment of FIG. 1, the UAV has a left thrust-generating device 18 supported by the left wing 14 and a right thrust-generating device 20 supported by the right wing 16. In the illustrated embodiment, the left and right thrust-generating devices include left and right electric motors mechanically coupled to left and right propellers 22, 24. In other embodiments, each of the left and right thrust-generating devices may be another suitable type of power plant such as, for example, an electric motor to an electric ducted fan (EDF), a gas turbine engine, or a piston engine coupled to a propeller, i.e. a radial reciprocating-type internal combustion engine. The UAV may have four power plants of the same type or it may have two or more different types of power plants, e.g. two EDF units plus two motor-propeller power plants, two radial piston engines plus two motor-propeller power plants, etc.

As further illustrated in FIG. 1, the UAV includes a vertical stabilizer having a top portion 26. The vertical stabilizer may or may not have a rudder as a further control surface.

As further illustrated in FIG. 1, a top thrust-generating device 28 is mounted to the top portion 26 of the vertical stabilizer. The top thrust-generating device is, in the illustrated embodiment, an electric motor mechanically coupled to a top propeller 30, although it may be any of the other types of power plants described above.

As further illustrated in FIG. 1, the UAV 10 includes a bottom portion 32 of the vertical stabilizer. The UAV includes a bottom thrust-generating device 34 mounted to the bottom portion 32 of the stabilizer. The bottom thrust-generating device is, in the illustrated embodiment, an electric motor mechanically coupled to a bottom propeller 36, although it may be any of the other types of power plants described above.

As illustrated, the top stabilizer and the bottom stabilizer are aligned with a longitudinal plane of symmetry of the UAV. The top stabilizer and the bottom stabilizer may be identically shaped and sized, or these may have different sizes and/or shapes.

A symmetrical pair of the left, right, top and bottom thrust-generating devices cooperate to provide forward thrust during forward flight, e.g. the left and right devices or, alternatively, the top and bottom devices. The left, right, top and bottom thrust-generating device also provide vertical thrust to enable the unmanned aerial vehicle to take off and land vertically when the fuselage is substantially vertical. These four thrust-generating devices enable the unmanned aerial vehicle to transition between forward flight and vertical take-off and landing.

In one embodiment, only the two of the four thrust-generating devices provide thrust for forward flight. In a more specific embodiment, the left and right thrust-generating devices provide the thrust for forward flight whereas all four devices, i.e. the left, right, top and bottom thrust-generating devices, generate thrust for vertical take-off and landing (VTOL) as well as for hovering. In one embodiment, the top and bottom thrust-generating devices are foldable to lessen aerodynamic drag during forward flight. In other embodiments, a subset of the four thrust-generating devices are disabled and folded during forward flight.

For vertical take-off and landing (VTOL), the UAV is oriented vertically such that the thrust-generating devices are all substantially vertical. After transitioning to forward flight, the UAV is substantially horizontal, i.e. generally parallel to the ground.

Figure 2A:
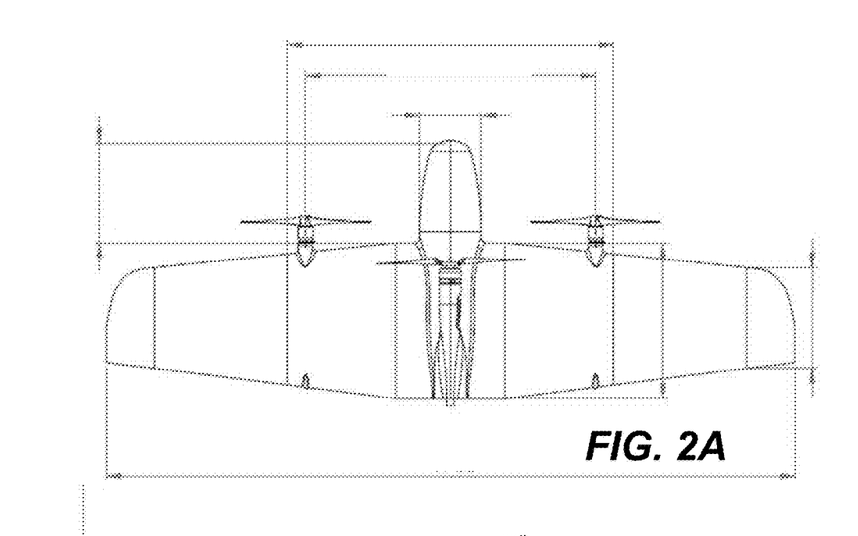
FIG. 2A is a top view of the UAV.
Figure 2B:
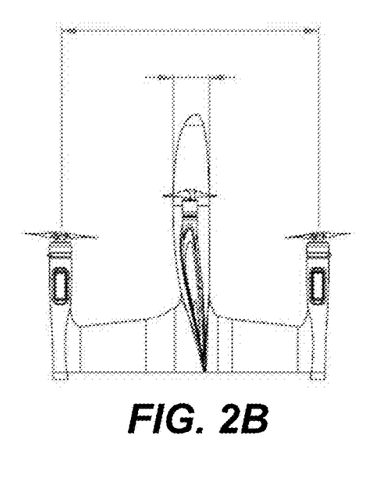
FIG. 2B is a side view of the UAV.
Figure 2C:
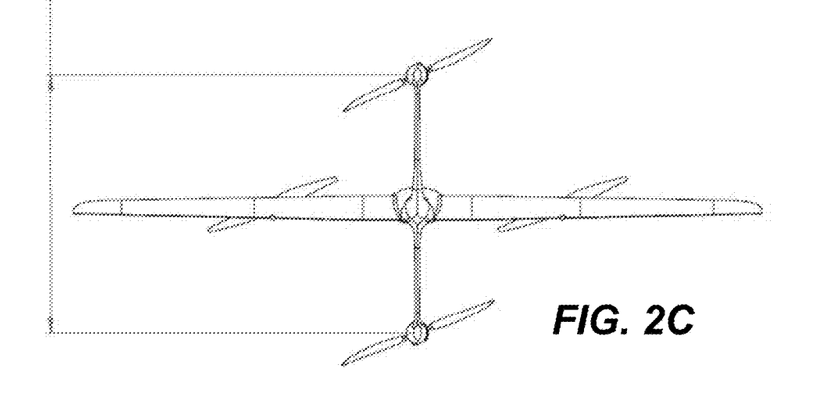
FIG. 2C is a rear view of the UAV.

FIGS. 2A, 2B and 2C are top, side and rear views of the UAV. One geometric feature that is apparent from this particular design of the UAV is that the distance between the left and right thrust-generating devices 18, 20 is greater than the distance between the top and bottom thrust-generating devices 28, 34. More specifically, the distance between the axis of rotation of the left propeller 22 and the axis of rotation of the right propeller 24 is greater than the distance between the axis of rotation of the top propeller 30 and the axis of rotation of the bottom propeller 36.

Figure 3:
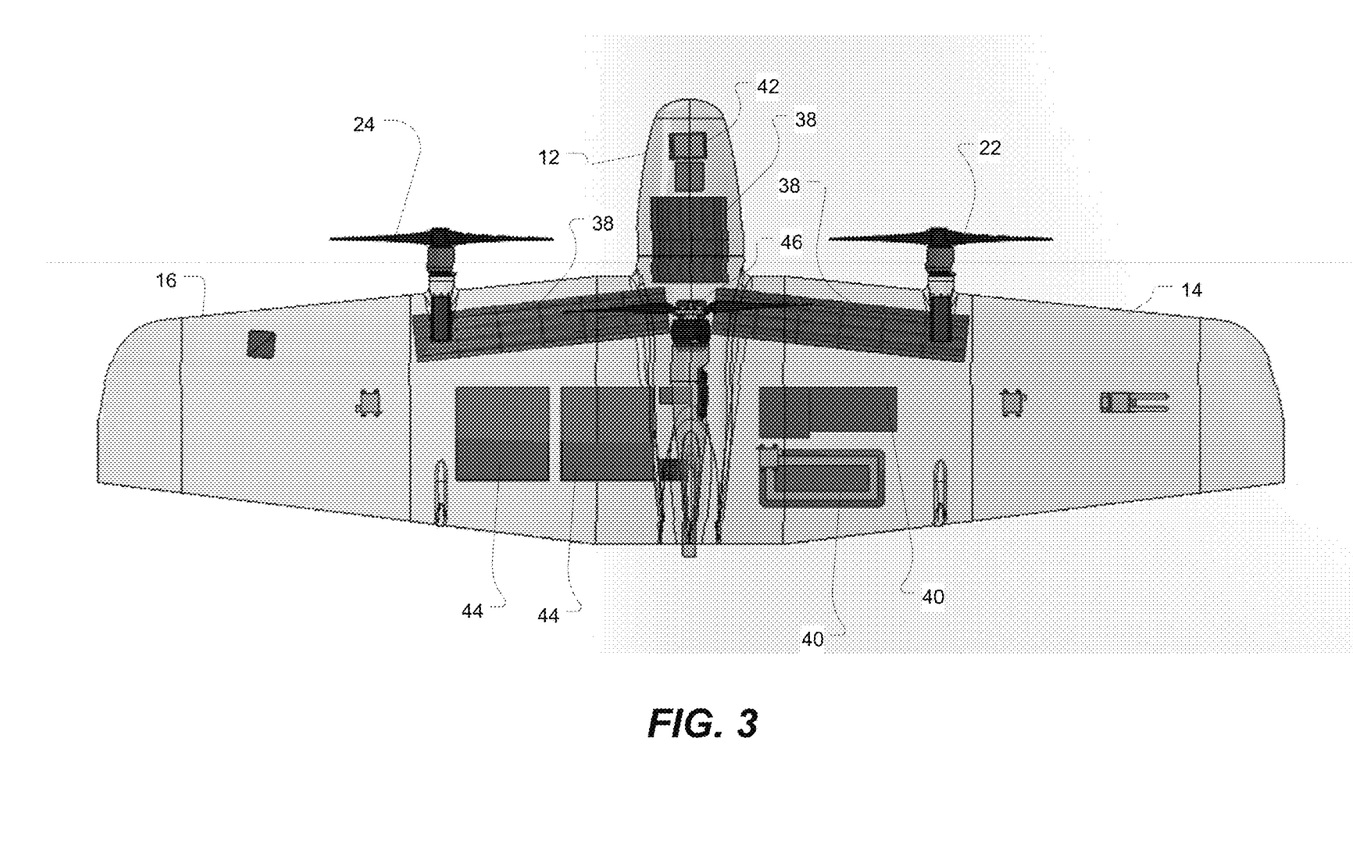
FIG. 3 is a bottom, partial cutaway view of the UAV

As illustrated in FIG. 3, the UAV includes an onboard power source (or multiple sources) for powering the thrust-generating devices, the control surfaces and also other onboard equipment or devices. The onboard power source may be a battery or batteries 38. The UAV has three batteries 38 symmetrically housed within the airframe. Specifically, two batteries 38 are symmetrically disposed within the left and right wings as shown in FIG. 3 while a third battery 38 is disposed within the fuselage as shown in this same figure. The UAV may optionally employ capacitors, ultra-capacitors or super-capacitors in addition to, or in lieu of, the battery or batteries.

For implementations in which the thrust-generating devices are combustion engines, the UAV would include a gas tank for storing a combustible fuel such as kerosene, gasoline, etc.

The battery or batteries 38 may be inductively recharged by landing the UAV on an inductive recharging pad of a recharging station. A plurality of recharging stations are distributed at remote sites to enable the UAV to be recharged without having to return to the main ground control station. The recharging stations thus prolong the UAV's mission time and range which is useful for monitoring of remote locations or sites. For example, the recharging stations may be installed at intervals along a pipeline where pumping stations are situated. The recharging stations may draw electric power from the pumping stations to permit the recharging of the UAV. To enable wireless power transfer (WPT) to the UAV, e.g. inductive recharging, the UAV includes WPT circuitry 40. Accordingly, in a main embodiment, the UAV is a tail-sitter UAV having WPT circuitry for wirelessly recharging while the UAV is sitting on its tail, i.e. resting in its tail-sitting position. In other embodiments, a charging device other than a WPT device may be used to recharge the UAV. In one embodiment, inside a wing of the UAV is a wireless (inductive) recharging coil or coils. A door or hatch disposed on the wing or fuselage is configured to open, e.g. in response to a door-open signal. The inductive coil or coils can be displaced by a coil servo, e.g. in response to a displacement signal, toward the charging pad of the charging station to minimize the distance between the charging pad and the coil, thereby increasing recharging efficiency. When recharging is complete, the coil can be retracted by the servo into the UAV (e.g. in response to a retract signal) and then the door or hatch is closed (e.g. in response to a door-close signal).

As further illustrated in FIG. 3, the UAV has a digital camera 42, e.g. a 4K ultra HD camera or any other suitable camera. The UAV may have one or more still cameras or video cameras (e.g. CCD or CMOS digital cameras). The camera records still or video images in any suitable data format and locally stores the image and video data in one or more data storage devices 44 onboard the UAV. The camera may be connected to the data storage devices via a data bus. Each of the data storage devices 44 may be a magnetic or semiconductor memory such as a hard disk drive or solid state drive. The imagery/video data may be stored as raw data or it may be processed or partially processed. The data may be compressed using any known data compression format. The data, or compressed data, may be encoded for wireless data transmission. The data may be encrypted using cryptographic techniques for secure storage and/or for secure transmission of the data back to the main ground control station.

The video format captured by the camera of the UAV may be preset or remotely configured by commands sent to the UAV by the main ground control station. The camera may be configured to adjust various characteristics of the video format such as frame size (pixel dimension of the frame), aspect ratio, frame rate, bit rate, and if applicable, an audio sample rate.

Also shown in FIG. 3 is an autopilot module 46 (or flight controller) for autonomously flying the UAV. The autopilot module generates control command signals for the thrust-generating devices and control surfaces to adjust pitch, yaw and roll to keep the UAV flying within predetermined flight envelope parameters. The autopilot module receives real-time flight performance data from various onboard sensors such as three-axis gyros, accelerometers, GPS receiver, pilot tubes (for airspeed), camera, barometric sensor, etc. The autopilot module computes in real-time adjustments to thrust and control surfaces to maintain the target speed, course, altitude, pitch, roll and yaw. The autopilot module outputs control signals for the thrust-generating devices and control surfaces. The control signals may be drive currents sent to each electronic speed controller (ESC) associated with each electric motor. The control signals may also be drive currents sent to servos or actuators connected to the control surfaces.

The autopilot module may receive inputs in the form of airspeed (or groundspeed), altitude, destination, loiter path, etc. from a main ground control station. As will described below, telemetry data (actual airspeed or groundspeed, actual altitude and location, motor RPM, motor temperature, ambient temperature, barometric pressure, etc.) may be relayed back to the main ground control station to enable monitoring of the performance of the UAV.

Figure 4:
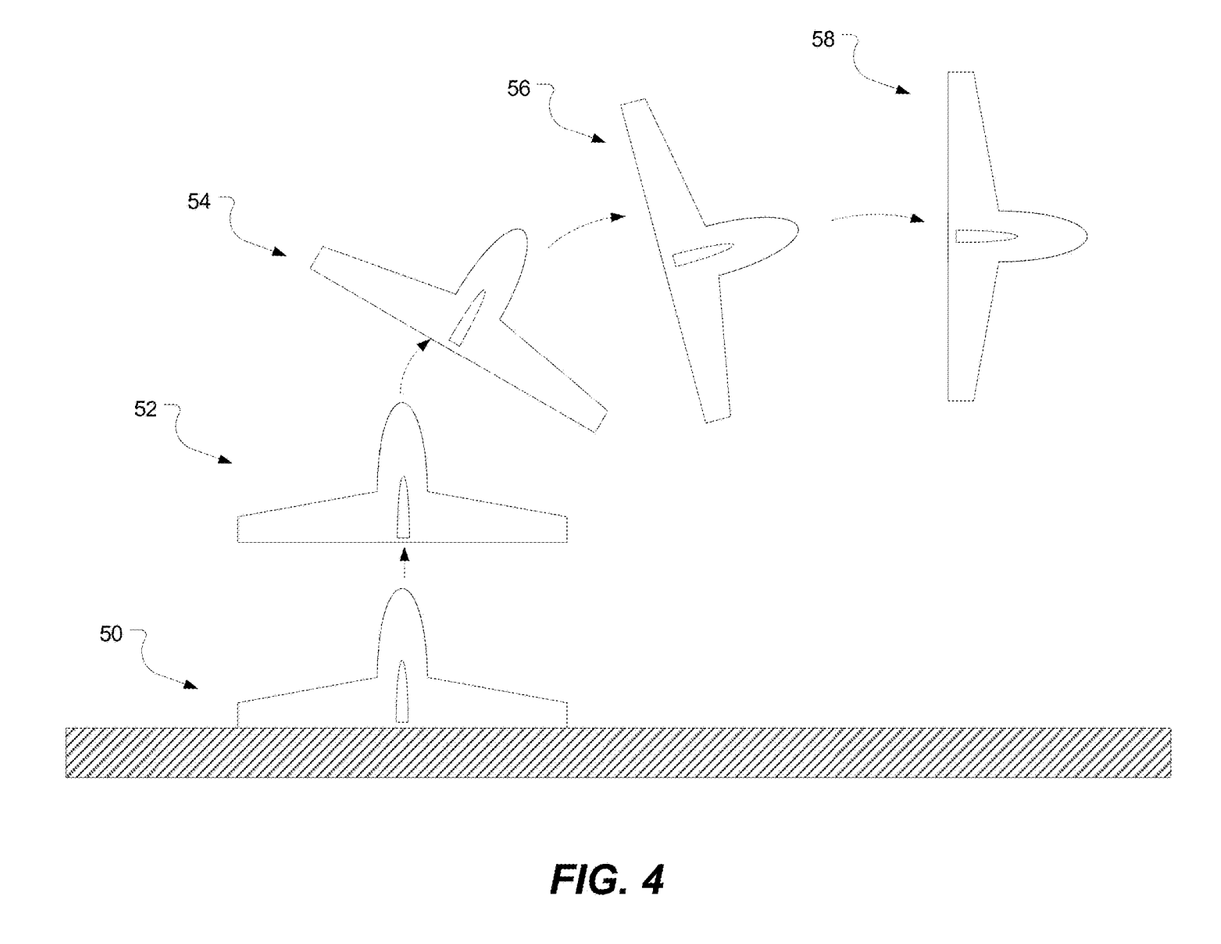
FIG. 4 is a schematic depiction of the UAV taking off vertically and then transitioning to forward flight.

FIG. 4 is a schematic depiction of the VTOL-capable UAV taking off vertically and then transitioning to forward flight. The UAV rests on the ground in an upright or vertical posture in a ground-resting position 50. The UAV takes off vertically using all four thrust-generating devices. The UAV in the vertical takeoff posture 52 is still substantially vertically aligned. First and second transitional postures 54, 56 show the UAV transitioning, without stalling, from vertical takeoff to a horizontal flight posture 58. In forward flight the top and bottom thrust-generating devices may be disabled and folded.

Figure 5:
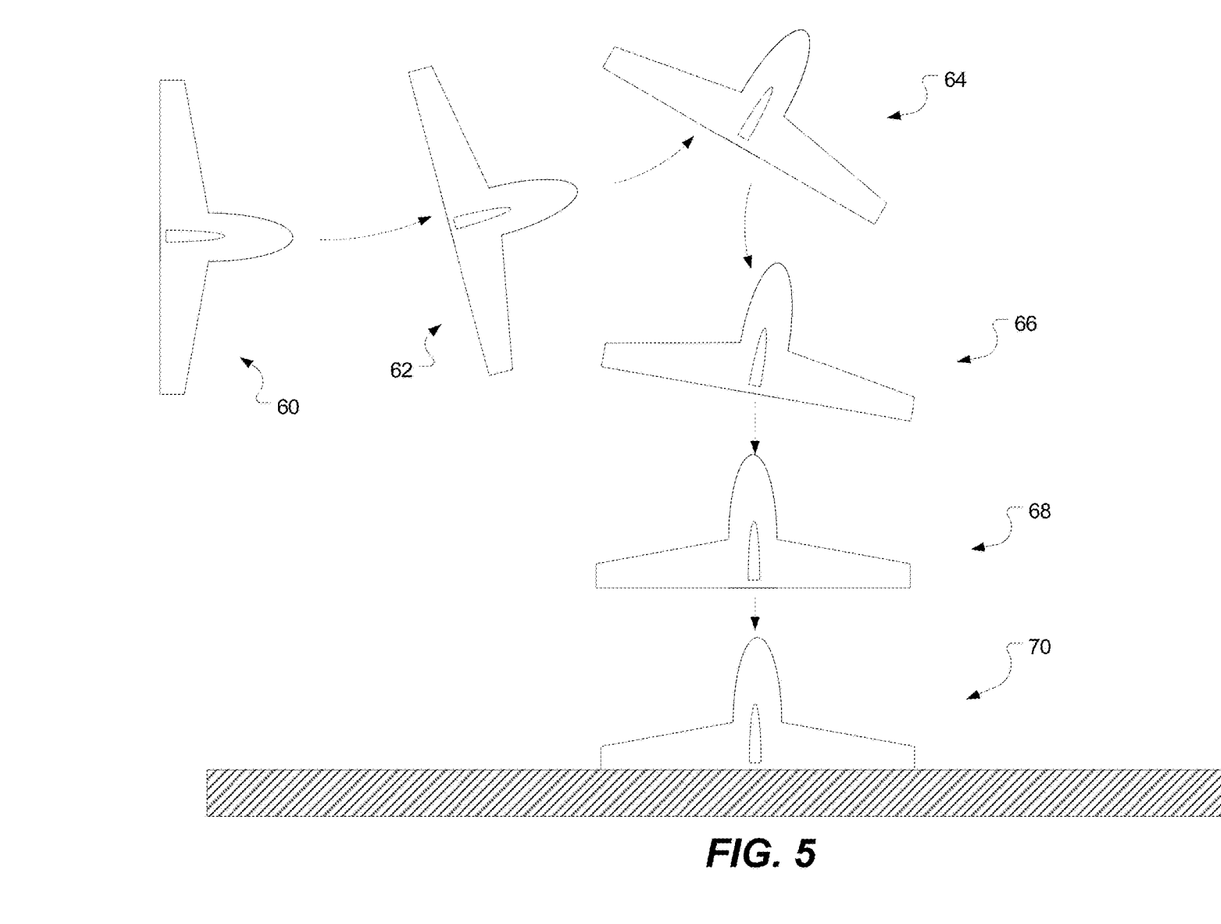
FIG. 5 is a schematic depiction of the UAV transitioning from forward flight to vertical landing.

FIG. 5 is a schematic depiction of the VTOL-capable UAV transitioning from forward flight to vertical landing. The UAV slows down in a pre-landing forward flight posture 60 which is a generally horizontal posture i.e. parallel to the ground. To avoid stalling, the VTOL-capable UAV pitches upwardly and gains altitude slightly in pre-landing transitional postures 62, 64. In transitioning from forward to vertical flight modes, the top and bottom thrust-generating devices are reactivated. The UAV then begins to descend in a transitional landing posture 66 during which the UAV rotates toward a purely vertical landing posture 68. The UAV then lands vertically, attaining the vertical landed posture 70. The trailing edges of the wings and stabilizers act as ground-contacting supports for the UAV in this posture. When hovering, the UAV is in vertical postures 52, 68. When loitering, the UAV is flying forward in prescribed path around a target area being monitored. The loitering UAV may fly any suitable path such as a circular, oval or "racetrack" path, banking continually or periodically remain on station above the target area.

Transitioning without stalling from VTOL postures to forward flight postures can be accomplished using a transitional flight envelope, i.e. a set of flight parameters within which the UAV transitions without stalling. Flight performance sensors, e.g. three-axis gyros, accelerometers, pitot tubes (for airspeed), GPS data, etc., can be fed into a flight controller to manage thrust and control surfaces of the UAV to remain within the transitional envelope.

The unmanned aerial vehicle further includes one or more onboard processors, e.g. a microprocessor, computer or computing device. The processor is configured to receive flight-performance data from a plurality of flight-performance sensors (pitch-yaw-roll accelerometers, pitot tubes or other airspeed measuring devices, motor RPM, motor temperature, battery life, etc.) and to perform flight control operations in response to receiving the flight-performance data such that the processor provides fully autonomous flight control of the unmanned aerial vehicle. The UAV may thus have an auto-pilot or flight director algorithm to maintain the UAV within the flight envelope. The auto-pilot or flight director algorithm enables beyond line of sight (BLOS) operations. The UAV may optionally be remotely piloted.

In unmanned aerial vehicle depicted in FIG. 3, the camera may be part of a more comprehensive ground-monitoring sensor suite powered by the onboard power source. The ground-monitoring sensor suite could include a plurality of sensors (in addition to the digital camera mentioned above) such as, for example, infrared sensors, thermal imaging sensors, hyperspectral camera, and radar (e.g. synthetic aperture radar).

The ground-monitoring sensor suite of the UAV is thus able to perform monitoring, reconnaissance, inspection and surveillance of structures or objects on the ground such as, for example, pipelines, borders, factories, facilities, farmland, forests, coastlines, natural disaster zones, etc. The sensors of the sensor suite may be packaged separately or together or in clusters. The sensors may be fixed to underside of the fuselage or wings or to any other suitable part of the UAV. The sensors may be mounted on turrets, swivels, gimbals or other mechanisms driven by servos, motors or actuators permitting the sensors to be maneuvered or oriented relative to airframe of the UAV. The sensors may be fixed or deployable/retractable. The fuselage or wings may include hatches or doors that open and close when the sensors are deployed and retracted.

The sensor suite of the UAV may also include a chemical sniffer capable of sampling ambient air and detecting biological, chemical, or radioactive materials. The sniffer may employ air sampling technology based on electrospray ionization or other suitable technique. The unmanned aerial vehicle may in some embodiments include an outboard temperature sensor and a barometric pressure sensor.

The UAV may include navigation lights (anti-collision lights). The UAV may also include a transponder that broadcasts an RF signal to identify itself to others.

The unmanned aerial vehicle further includes a Global Navigation Satellite System (GNSS) receiver chip for receiving GNSS signals from orbiting GNSS satellites and for determining a current position of the unmanned aerial vehicle in response to receiving the GNSS signals. The GNSS receiver chip may be, for example, a Global Positioning System (GPS) receiver chip for receiving and processing GPS signals. In one embodiment, the UAV may have two GPS chips for redundancy and/or to improve positioning accuracy. Other satellite navigation systems (GLONASS, Beidou, Compass, Galileo) may be used. Ground-based navigation radio beacons may also be used for navigation.

The unmanned aerial vehicle further includes a radio frequency (RF) transceiver (with antenna) coupled to the processor for transmitting sensor data from the ground-monitoring sensor suite to the main ground control station. The UAV may also optionally transmit telemetry data (including flight-performance data such an airspeed, altitude, location, etc.) to the main ground control station. The UAV and main ground control station together constitute an unmanned aerial system (UAS) for performing remote monitoring, surveillance and inspection. The main ground control station may include a main data center for receiving, processing and storing the sensor data, e.g. ground imagery. The radio frequency transceiver coupled to the processor is configured to receive commands from the main ground control station. As such, the RF transceiver enables bidirectional communication with the main ground control station. For example, the commands may include one or more of various mission commands such as, for example, a destination command to fly to a destination, a route command specifying GNSS waypoints, a return-to-base (RTB) command, a hover command, a loiter command, and a sensor-activation command. The RF communication link over which commands are transmitted may employ cryptographic techniques to authenticate the commands to ensure that the UAV is not hijacked.

In one embodiment, the unmanned aerial vehicle may optionally include an air-to-air RF communication link to enable the transfer of data to and from another unmanned aerial vehicle.

The processor, in one embodiment, may execute a machine-vision algorithm to automatically recognize predetermined objects in captured imagery. The processor may trigger an action in response to recognizing one of the predetermined objects. The action may be generating and transmitting an alert, communication or notification to the main ground control station. The action may be to deploy a further sensor. The action may be to change course or altitude.

The UAV may automatically determine when it must divert to a recharging station. Or this function can be manually triggered by a command sent from the main ground control station by a user monitoring battery life sent as part of telemetry data. If the UAV automatically decides when to divert for recharging, the UAV will take into account the distance to the recharging station, battery life, weather and wind conditions, and the availability of the recharging station. In such an implementation, the processor of the UAV computes a distance to a nearest battery-recharging station, estimates and compares the power required to fly to the nearest battery-recharging station with a remaining battery charge and then decides whether to continue a mission or divert to the nearest battery-recharging station. In this implementation, the processor of the UAV may cause the radio frequency transceiver to transmit a query to the nearest battery-recharging station to ascertain whether the nearest battery-recharging station is available to receive and recharge the unmanned aerial vehicle. In this implementation, the processor cooperates with the radio frequency transceiver to receive and process a reply to the query. The processor then programs a flight path to the battery-recharging station in response to the query indicating that the battery-recharging station is available. If the nearest battery-recharging station is unavailable, the processor transmits a second inquiry to a second-nearest battery-recharging station in response to the query indicating that the battery-recharging station is unavailable.

Alternatively, the processor can be configured to instruct the radio frequency transceiver to transmit a query to the main ground control station to request location coordinates for the nearest available battery-recharging station that is available to receive and recharge the unmanned aerial vehicle. In this paradigm, the main ground control station receives status updates from the remote recharging stations and can notify the UAV as to which recharging station nearby (i.e. within range) is available. The main ground control station sends a reply to the query. The processor of the UAV thus cooperates with the radio frequency transceiver to receive and process the reply to the query. The processor optionally transmits a confirmation and estimated time of arrival back to the main ground control station. The main ground control station thus reserves a timeslot at the battery-recharging station.

In one embodiment, the unmanned aerial vehicle further includes a Wi-Fi transceiver, or any other equivalent short-range wireless transceiver, for exchanging data with a battery-recharging station while recharging or while in the vicinity of the recharging station. The Wi-Fi transceiver may transmit sensor data to the battery-recharging station for relaying to the main ground control station, e.g. image data to enable the UAV to free up more memory space. The Wi-Fi transceiver may receive mission parameter data, e.g. waypoints, new destinations, etc, from the battery-recharging station relayed from the main ground control station. The Wi-Fi transceiver may receive a software update from the battery-recharging station relayed from the main ground control station. This enables software updates without requiring the UAV to return to base.

When the UAV travels toward a recharging station, the UAV may be GNSS-guided. However, due to the limited positioning accuracy of GNSS, the unmanned aerial vehicle, in one embodiment, includes a short-range guidance subsystem (precision landing subsystem) for receiving one or more beacons from the battery-recharging station to enable the unmanned aerial vehicle to land precisely on an inductive charging pad of the battery-recharging station. The precision landing subsystem may use infrared (IR) or laser technologies to precisely position the UAV relative to the charging pad or alternatively may use a camera-guidance system.

The UAV may also have an onboard battery manager executed, for example, by the processor. The battery manager may be configured to deactivate one or more sensors of the sensor suite in a predetermined order in response to detecting a low battery condition. Alternatively or additionally, the battery manager may moderate flight performance, e.g. reduce speed, hibernate non-essential computer systems, or perform any other power-saving action to prolong battery life.

In the foregoing description, the UAV has one or more processors to perform the various functions described above. In other embodiments, there may be dedicated microcontrollers or controllers for discrete subsystems or functions.

Figure 6:
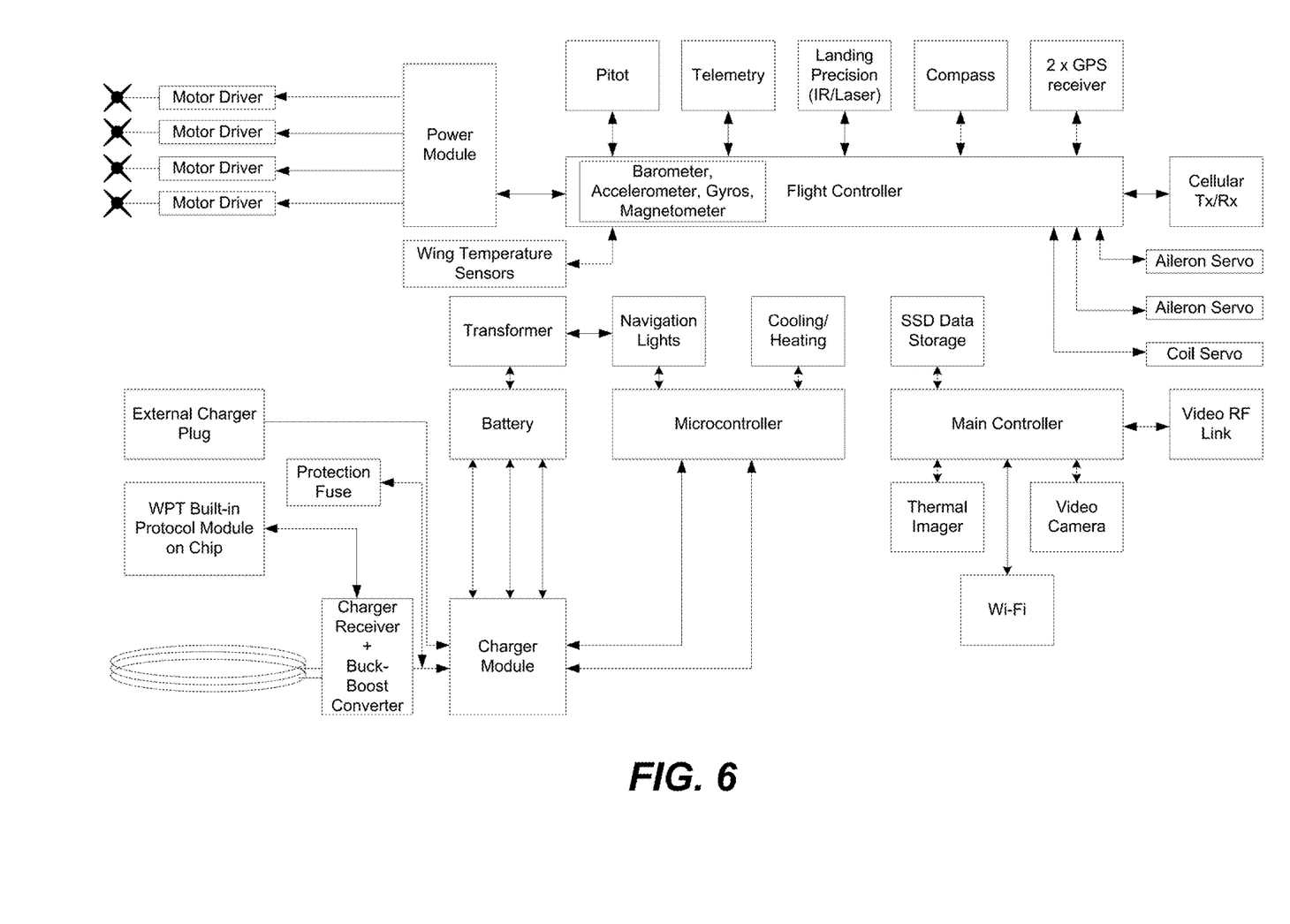
FIG. 6 is a block diagram of electrical components of the UAV.

FIG. 6 is a block diagram of electrical components of one example implementation of the UAV. This figure illustrates only one exemplary embodiment of an electro-mechanical system onboard the UAV but, as will be appreciated, this is only one such arrangement. In the example presented in FIG. 6, there are discrete microcontrollers for different subsystems: a microcontroller for the power management subsystem, a main controller for video data collection, storage and transmission, and a flight controller for autopilot functions, i.e. autonomously flying the UAV. As shown by way of example in FIG. 6, the UAV may have a wireless power transfer (WPT) built-in protocol module on a chip, an inductive charging coil, a power receiver unit with a buck-boost converter, external charger plug, and charger module for a balanced charging of the batteries. The inductive coil may be movable by a servo ("coil servo") in order to keep the UAV aerodynamic shape while in the air. A voltage converter may be used for stepping up or stepping down the voltage provided by the battery. As further shown in FIG. 6, the flight controller may be connected to various sensors such as wing temperature sensors, barometer, accelerometer, gyro, magnetometer, pitot tube, compass, and a GPS. The flight controller, as shown as an example in FIG. 6, also sends signals to the aileron servos and the coil servo. A power module distributes voltage and current to the flight controller and to four motor drivers (e.g. electronic speed controllers) and by that powering up the electric motors, which may be brushless motors. As further illustrated by way of example in FIG. 6, the main controller interfaces with the video camera, thermal imager, external memory device (e.g. SD card, Solid State Drive), Wi-Fi transceiver and video RF link.

The following detailed description contains, for the purposes of explanation, numerous specific embodiments, implementations, examples and details in order to provide a thorough understanding of the invention. It is apparent, however, that the embodiments may be practiced without these specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. An unmanned aerial vehicle comprising:
a fuselage;
left and right wings connected to the fuselage to generate lift in forward flight;
a left thrust-generating device supported by the left wing;
a right thrust-generating device supported by the right wing;
a vertical stabilizer;
a top thrust-generating device mounted to a top portion of the vertical stabilizer;
a bottom thrust-generating device mounted to a bottom portion of the vertical stabilizer;
an onboard power source comprising a battery for powering the left, right, top and bottom thrust-generating devices;
an inductive charging coil for inductively recharging the battery from an inductive charging pad of a battery-recharging station, wherein the inductive charging coil is displaceable relative to the fuselage toward the inductive charging pad for increasing a charging efficiency;
a hatch disposed on one of the wings or on the fuselage and wherein the hatch is opened to enable the coil to be displaced toward the inductive charging pad while the vehicle is stationary;
wherein a symmetrical pair of the left, right, top and bottom thrust-generating devices provide forward thrust during forward flight and wherein the left, right, top and bottom thrust-generating devices provide vertical thrust to enable the unmanned aerial vehicle to take-off and land vertically when the fuselage is substantially vertical and further enabling the unmanned aerial vehicle to transition between forward flight and vertical take-off and landing.

2. The unmanned aerial vehicle of claim 1 wherein the left, right, top and bottom thrust-generating devices are electric motors coupled to respective propellers and wherein the battery supplies power to the electric motors.

3. The unmanned aerial vehicle of claim 2 comprising a processor that is configured to deactivate one or more sensors of a sensor suite in a predetermined order in response to detecting a low battery condition.

4. The unmanned aerial vehicle of claim 2 wherein the fuselage and wings comprise photovoltaic cells to convert solar energy into electric power to recharge the battery.

5. The unmanned aerial vehicle of claim 1 further comprising a ground-monitoring sensor suite powered by the onboard power source, the ground-monitoring sensor suite comprising one or more sensors selected from the group consisting of still cameras, video cameras, infrared sensors, thermal imaging sensors, and radar.

6. The unmanned aerial vehicle of claim 1 further comprising a processor configured to receive flight-performance data from a plurality of flight-performance sensors and to perform flight control operations in response to receiving the flight-performance data such that the processor provides fully autonomous flight control of the unmanned aerial vehicle.

7. The unmanned aerial vehicle of claim 1 further comprising a Global Navigation Satellite System (GNSS) receiver chip for receiving GNSS signals from orbiting GNSS satellites and for determining a current position of the unmanned aerial vehicle in response to receiving the GNSS signals.

8. The unmanned aerial vehicle of claim 1 further comprising a radio frequency transceiver coupled to a processor for transmitting sensor data from the ground-monitoring sensor suite and the flight-performance data to a main ground control station.

9. The unmanned aerial vehicle of claim 1 further comprising a radio frequency transceiver coupled to a processor for receiving commands from a main ground control station.

10. The unmanned aerial vehicle of claim 9 wherein the commands comprise one or more of: a destination command to fly to a destination, a route command specifying GNSS waypoints, a return-to-base (RTB) command, a hover command, a loiter command, and a sensor-activation command.

11. The unmanned aerial vehicle of claim 1 comprising a processor configured to compute a distance to a nearest battery-recharging station, to estimate and compare the power required to fly to the nearest battery-recharging station with a remaining battery charge and then to decide whether to continue a mission or divert to the nearest battery-recharging station.

12. The unmanned aerial vehicle of claim 11 wherein the processor causes a radio frequency transceiver to transmit a query to the nearest battery-recharging station to ascertain whether the nearest battery-recharging station is available to receive and recharge the unmanned aerial vehicle.

13. The unmanned aerial vehicle of claim 12 wherein the processor cooperates with the radio frequency transceiver to receive and process a reply to the query, wherein the processor programs a flight path to the battery-recharging station in response to the query indicating that the battery-recharging station is available.

14. The unmanned aerial vehicle of claim 12 wherein the processor cooperates with the radio frequency transceiver to receive and process a reply to the query, wherein the processor transmits a second inquiry to a second-nearest battery-recharging station in response to the query indicating that the battery-recharging station is unavailable.

15. The unmanned aerial vehicle of claim 11 wherein the processor causes a radio frequency transceiver to transmit a query to a main ground control station to request location coordinates for a nearest available battery-recharging station that is available to receive and recharge the unmanned aerial vehicle.

16. The unmanned aerial vehicle of claim 15 wherein the processor cooperates with the radio frequency transceiver to receive and process a reply to the query, wherein the processor transmits a confirmation and estimated time of arrival to the main ground control station for relaying to the battery-recharging station.

17. The unmanned aerial vehicle of claim 1 wherein only the left and right thrust-generating devices generate thrust for forward flight and wherein the left, right, top and bottom thrust-generating devices generate thrust for take-off, landing and hovering.

18. The unmanned aerial vehicle of claim 1 wherein the top and bottom thrust-generating devices are foldable.

19. The unmanned aerial vehicle of claim 1 further comprising a Wi-Fi transceiver for exchanging data with a battery-recharging station.

20. The unmanned aerial vehicle of claim 19 wherein the Wi-Fi transceiver transmits sensor data to the battery-recharging station for relaying to a main ground control station.

21. The unmanned aerial vehicle of claim 19 wherein the Wi-Fi transceiver receives mission parameter data from the battery-recharging station relayed from a main ground control station.

22. The unmanned aerial vehicle of claim 19 wherein the Wi-Fi transceiver receives a software update from the battery-recharging station relayed from a main ground control station.

23. The unmanned aerial vehicle of claim 1 further comprising a short-range guidance subsystem for receiving one or more beacons from the battery-recharging station to enable the unmanned aerial vehicle to land precisely on the inductive charging pad of the battery-recharging station.

24. The unmanned aerial vehicle of claim 1 further comprising an air-to-air RF communication link to enable the transfer of data to and from another unmanned aerial vehicle.

25. The unmanned aerial vehicle of claim 1 comprising a processor configured to execute a machine-vision algorithm to automatically recognize predetermined objects in captured imagery and to trigger an action in response to recognizing one of the predetermined objects.

* * * * *

UNITED STATES PATENT AND TRADEMARK OFFICE
CERTIFICATE OF CORRECTION

PATENT NO. : 10,137,983 B2  
APPLICATION NO. : 15/168842  
DATED : November 27, 2018  
INVENTOR(S) : David Horn Page 1 of 1

It is certified that error appears in the above-identified patent and that said Letters Patent is hereby corrected as shown below:

On the Title Page

Item (30) should read:  
Foreign Application Priority Data  
May 6, 2016 (CA)...............2929254

Signed and Sealed this  
Nineteenth Day of February, 2019

Andrei Iancu  
*Director of the United States Patent and Trademark Office*